United States Patent [19]

Nelson

[11] 4,371,583
[45] Feb. 1, 1983

[54] MODIFIED IONOMER BLEND AND LAMINATED ARTICLE

[75] Inventor: Wayne F. Nelson, Akron, Ohio

[73] Assignee: A. Schulman, Inc., Akron, Ohio

[21] Appl. No.: 260,180

[22] Filed: May 4, 1981

[51] Int. Cl.$^3$ .................. B32B 15/08; B32B 27/20; B32B 27/28

[52] U.S. Cl. .................... 428/358; 428/461; 524/522; 524/518; 525/196; 525/211; 525/221

[58] Field of Search ............... 428/461, 358; 525/196, 525/211, 221

[56] References Cited

U.S. PATENT DOCUMENTS

| | | | |
|---|---|---|---|
| 3,264,272 | 8/1966 | Rees | 525/221 |
| 3,267,083 | 8/1966 | Imhof | 260/80.5 |
| 3,384,612 | 5/1968 | Brandt et al. | 260/41 |
| 3,454,676 | 8/1979 | Busse | 260/897 |
| 3,869,422 | 3/1975 | Dawes et al. | 260/897 B |
| 3,931,097 | 1/1976 | Fujio et al. | 260/878 R |

*Primary Examiner*—Carman J. Seccuro
*Attorney, Agent, or Firm*—Gordon W. Hueschen

[57] ABSTRACT

The disclosure relates to a modified ionomer blend which is characterized by excellent metal adhesion, good weatherability, and low gloss, consisting essentially of an intimate mixture of (1) about 20 to 60 percent of an ethylene-propylene rubber, in which ethylene is the predominant component, (2) about 40 to 80 percent of a copolymer containing ethylene units and carboxylic acid containing units, said copolymer containing between about 25 and 98.5 percent ethylene units and between about 1.5 and 30 percent carboxylic acid containing units, and said carboxylic acid units being from 10 to 100 percent neutralized with metallic ions, and (3) an effective amount up to about 10 percent of a coloring material selected from the group consisting of (1) carbon black, and (2) a pigment plus an ultraviolet stabilizer, with or without an antioxidant, and to a process in which the ionomer blend is extruded onto a metal strip which has first been cleaned with a detergent wash, rinsed with pure or deionized water, dried, heated, and passed through a crosshead die of an extruder concomitantly with the extrusion of the ionomer blend.

10 Claims, No Drawings

MODIFIED IONOMER BLEND AND LAMINATED ARTICLE

BACKGROUND OF THE INVENTION

1. Field of Invention

The invention relates to modified ionomers which are characterized by low gloss, excellent metal adhesion, and good weatherability, and which are particularly useful in forming trims used in the automotive industry.

2. Prior Art

Innumerable thermoplastics have previously been proposed for making trim or edging used in the automotive industry and otherwise, but with less than the desired degree of success where low gloss and/or metal adhesiveness is concerned. However, continued research has been directed to these problems particularly in the attainment of low-gloss trim and adequate adhesiveness in coatings formed on metal trim. Such low-gloss trim or coatings are highly desirable from an aesthetic standpoint, since their appearance is not greatly impaired during the course of their useful life, as is the case with glossy materials which lose their gloss during use with attendant appearance of aging. Metal surface coatings, such as vinyl thermoplastics, can thus be prepared so as to have some advantageous characteristics but, unfortunately, their adherence to metal leaves a great deal to be desired, so that adequate adhesion is only attained after the employment of a great many steps, even as many as nine steps, all of which must be considered pretreatments of the metal to which the vinyl is desired to adhere prior to the actual step of coating the metal. Numerous other thermoplastics have been proposed as metal surface coatings, especially for the automotive field, and these, although having greater or lesser degrees of adhesiveness to metal surfaces when compared with the previously-mentioned vinyl thermoplastics, are not characterized by low-gloss. At present no satisfactory metal-adherent thermoplastics are available which provide a combination of adequate adhesion to the metal and low gloss and, in fact, no adequate low-gloss thermoplastics of any kind are presently available in the art for such use. Moreover, in addition to the problem of the difficulty of attaining metal adhesiveness, even assuming that this characteristic has been adequately attained in prior art thermoplastics, the problem of adequate weatherability remains, as a result of which even the best metal adherent thermoplastics to date are characterized by unfortunate shortcomings such as fading, lost gloss when such originally exists, and loss of adhesiveness when exposed to the elements over any extended period such as is commonly encountered during the use of an automobile. It is therefore apparent that available metal coatings, especially such as are adapted for employment in the automotive field, are characterized by numerous failures and shortcomings, which have not been remedied according to the present state of the art, so that the provision of new and advantageous thermoplastic metal coatings, which are not subject to such failures and shortcomings as just enumerated and which are accordingly particularly well-adapted and suitable for use in the automotive area, would be highly desirable and would fill a long-felt need in the art.

OBJECTS OF THE INVENTION

It is an object of the present invention to provide novel thermoplastics. It is another object of the invention to provide novel thermoplastic blends which are particularly suited as metal coatings, particularly in the automotive and like industries. A further object of the invention is to provide novel thermoplastic blends of ionomer and rubber, which are particularly adapted for use in metal coating. Still another object of the invention is the provision of such thermoplastic blends which embody carbon black and which are especially suited for such employment, particularly in the automotive and like industries. A further object of the invention is the provision of such thermoplastic blends which embody ethylene-propylene rubber including ethylene-propylene-diene rubber, together with an ionomer and the carbon black, as previously mentioned. A still further object of the invention is the provision of such thermoplastic blends wherein the proportions of ethylene-propylene or ethylene-propylene-diene rubber, hereinafter sometimes referred to respectively as "EPR" or "EPDM", ionomer, advantageously in the form of an ethylene-methacrylic acid-metal copolymer, and carbon black are about 20 to 50 percent, about 40 to 80 percent, and an effective amount, up to about 10 percent, respectively. A still additional object is to provide thermoplastic blends of such materials within such proportions, which are characterized by excellent metal adhesion, good weatherability, and low gloss. Still a further object is to provide such blends wherein the proportions of the respective ingredients are 30–50, 50–70, and 2.5–5 percent, respectively, which represent the preferred ranges of proportions from the standpoint of attainment of most desirable characteristics. A still further object is to provide such compositions wherein the ethylene-methacrylic acid-metal ionomer is heavy in acid content and wherein the metal of the ionomer is zinc.

Still another object of the invention is the provision of such thermoplastic blends wherein the carbon black component is replaced by a like amount, preferably 1.5 to 3 percent, of pigment and an ultraviolet stabilizer, with or without an antioxidant, which is particularly well-adapted to provide the same advantageous characteristics in use as mentioned previously but with impartation of color to the coated metal product which, according to the skill of the art, is usually produced by extrusion procedure.

The foregoing and additional objects have been accomplished by the provision of the novel modified ionomers and/or ionomer blends of the present invention, more particularly the ionomer EPR or EPDM blends, especially those embodying carbon black, as fully set forth in the foregoing, but also those embodying pigment and ultraviolet stabilizer.

Still an additional object of the invention is to provide a method for the coating of metal with an ionomer blend according to the present invention by extruding the same directly upon the metal under suitable elevated temperature conditions with a minimum of pretreatment of the metal to be coated therewith to produce a durable bond directly between the ionomer blend and the metal surface.

Yet another object of the invention is to provide such a method for the bonding of an ionomer blend according to the invention with a metal fitting by simultaneously extruding the metal fitting and the ionomer blend of the invention under suitable elevated temperature conditions to produce a durable bond between the ionomer blend and the metal fitting.

Other objects of the invention will be apparent to one skilled in the art to which this invention pertains and still other objects will become apparent hereinafter.

SUMMARY OF THE INVENTION

In summary, the invention may be described representatively as follows:

A modified ionomer blend which is characterized by excellent metal adhesion, good weatherability, and low gloss, consisting essentially of an intimate mixture of (1) about 20 to 60 percent of an ethylene-propylene rubber, in which ethylene is the predominant component, (2) about 40 to 80 percent of a copolymer containing ethylene units and carboxylic acid containing units, said copolymer containing between about 25 and 98.5 percent ethylene units and between about 1.5 and 30 percent carboxylic acid containing units, and said carboxylic acid units being from 10 to 100 percent neutralized with metallic ions, and (3) an effective amount, up to about 10 percent, of a coloring material selected from the group consisting of (1) carbon black, advantageously 2.5 to 5 percent, and (2) a pigment plus an ultraviolet stabilizer, advantageously 1.5 to 3 percent, with or without an antioxidant; such blend in which said copolymer is a random ionic copolymer of units derived from an alpha-olefin of the formula $RCH=CH_2$, wherein R is hydrogen or an alkyl having from 1 to 8 carbon atoms, inclusive, and units derived from an alpha, beta-ethylenically-unsaturated carboxylic acid; such blend in which the ethylene-propylene rubber is ethylene-propylene copolymer rubber; such blend in which the ethylene-propylene rubber is ethylene-propylene-non-conjugated diene terpolymer rubber; such blend in which the non-conjugated diene is 1,4-hexadiene in which the alpha-olefin is ethylene and the carboxylic acid is methacrylic acid; such blend in which the alpha-olefin is ethylene and the carboxylic acid is methacrylic acid; such blend in which the amount of ethylene-propylene rubber is about 30 to 50 percent and the amount of random ionic copolymer is about 50 to 70 percent, such blend in which the ethylene-propylene rubber contains about 60 to 80 percent ethylenic units, in which the copolymer contains about 8 to 20 percent of carboxylic acid units, and in which the metal ions are zinc ions; and such blend in which the alpha-olefin is ethylene and the carboxylic acid is methacrylic acid; as well as:

A process for preparing a metal edging with a tough, non-glossy, adherent coating or inlay which comprises preparing a modified ionomeric blend consisting essentially of an intimate admixture of (1) about 20 to 60 percent of an ethylene-propylene rubber, in which ethylene is the predominant component, (2) about 40 to 80 percent of a copolymer containing ethylene units and carboxylic acid containing units, said copolymer containing between about 25 and 98.5 percent ethylene units and between about 1.5 and 30 percent carboxylic acid containing units, and said carboxylic acid units being from 10 to 100 percent neutralized with metallic ions, and (3) a coloring material in the proportions given above, selected from the group consisting of (1) carbon black, and (2) a pigment plus an ultraviolet stabilizer, with or without an antioxidant, cleaning the metal edging, heating the metal edging and flowing said blend onto a cleaned, heated surface of said metal; such process in which the metal edging is cleaned by washing with a detergent followed by a rinse with pure or de-ionized water; such process in which the metal and the blend are maintained at compatible temperatures during the processing; such process in which the metal and the blend are maintained at a temperature between about 400° and 430° F.; and such process in which the metal trim is passed through a crosshead die of an extruder designed to apply a coating of the ionomer blend thereon and in which said ionomer blend is concomitantly extruded at a rate to give a continuous smooth coating on said trim; as well as a metal trim having a tough, non-glossy adherent coating thereon comprised of a blend of (1) about 20 to 60 percent of an ethylene-propylene rubber, in which ethylene is the predominant component, (2) about 40 to 80 percent of a copolymer containing ethylene units and carboxylic acid containing units, said copolymer containing between about 25 and 98.5 percent ethylene units and between about 1.5 and 30 percent carboxylic acid containing units, and said carboxylic acid units being from 10 to 100 percent neutralized with metallic ions, and (3) coloring material in the proportions given above, selected from the group consisting of (1) carbon black, and (2) a pigment plus an ultraviolet stabilizer, with or without an antioxidant; such trim in which the trim is formed with inturned edges and in which said coating covers the entire outer surface of said trim including said inturned edges but not the inner surface thereof; such trim in which the trim is formed with a channel and the coating is applied to fill said channel only; and such metal trim, having a tough, non-glossy adherent coating thereon, which is formed by flowing a melt of said blend onto a cleaned and heated surface of the trim.

DESCRIPTION OF THE INVENTION

By combining an ethylene-propylene rubber and an ionic copolymer of the class described and applying it to the metal edging, as described, there is obtained an adherent coating of good weatherability and low gloss. Moreover, good adhesion is obtained even though the metal is given no pre-preparation other than washing with a detergent solution, rinsing with pure or de-ionized water, and drying. Thus the desideratum of the prior art which heretofore has not been fully realized is obtained and the disadvantages thereof are avoided.

Ethylene-propylene rubbers suitable for use in the invention are well-known in the art. Suitable such material includes EPR, ethylene-propylene copolymer rubber and EPDM, ethylene-propylene-non-conjugated diene rubber. The former is a copolymer of ethylene and propylene and the latter is a terpolymer of ethylene, propylene and a non-conjugated diene such as 1,4-hexadiene, ethylidene norbornene, and dicyclopentadiene. Suitable such ethylene-propylene rubbers are disclosed in U.S. Pat. Nos. 3,658,752, 3,758,643, and 4,078,020. Suitable such ethylene rubbers are obtained by copolymerizing ethylene and propylene in the proportions of 60–85 percent ethylene and 15–40 percent propylene, advantageously 65–82 percent and 18–35 percent propylene, with or without the inclusion of a minor amount, up to about 5 percent, of a diene such as 1,4-hexadiene, norbornene, alkylidene norbornene, alkenyl norbornene, and dicyclopentadiene.

The parts and percentages given herein are by weight unless otherwise specified.

Suitable ionic copolymers are prepared by copolymerizing an alpha-olefin and an alpha, beta-ethylenically unsaturated carboxylic acid and are available on the market for E. I. DuPont de Nemours under the trademark Surlyn. The composition of these polymers can vary widely, as disclosed in U.S. Pat. Nos. 3,845,163 and 4,010,222, from between about 25 and 98.5 percent ethylene units and about 1.5 to about 30 percent carboxylic acid containing units.

Ordinarily, the olefin units are derived from ethylene and the carboxylic acid containing units from methacrylic acid. Generally speaking, it is of advantage for the purposes of this invention to have from about 8 to about 18 percent by weight of carboxylic acid containing units in the ionomer and to have the carboxylic acid groups at least 10 percent neutralized with metallic ions, especially zinc. Optimum adhesiveness to metal is obtained under these conditions. Copolymers of this type are also described, among other places, in U.S. Pat. Nos. 2,599,123 and 3,264,272 and Belgium Pat. No. 818,609. The polymers can be made by copolymerization or by graft polymerization, as set forth in U.S. Pat. No. 4,010,222.

Thus, both the ethylene-propylene rubbers and the ionomers used in the present invention are well-known in the art and their composition and manufacture do not constitute any part of the invention, except as the proportions may or may not effect the metal adhesiveness, weatherability and gloss of the resulting blend.

Suitable such products include the Surlyns#, M1650, M1652, M1705, as well as some of the copolymers listed in Table II of U.S. Pat. No. 4,010,222, particularly copolymers C and D. Suitable ethylene-propylene rubbers include those specifically mentioned in Table I of U.S. Pat. No. 4,078,020.

The inclusion of ethylene-propylene rubber, especially where the ethylene component predominates, produces a blend which has the requisite adhesiveness to metal and the desired low gloss, but which does not have stability to withstand weathering. To remedy this condition, there is included in the blend an effective amount, up to about 10 percent, advantageously 2.5 to 5 percent, of carbon black, which functions both to color the blend and to stabilize it against oxidation. If desired, however, a like amount, advantageously 1.5 to 3 percent, of colored pigment can be incorporated in the blend, especially when it is desired to have the trim or edging match or complement the surface to which it is applied. In such case, it is desirable to include along with the pigment an ultraviolet stabilizer, such as an ultraviolet opacifier, or the like, with or without an effective amount, up to about 0.3 percent, advantageously, 0.1 to 0.2 percent, antioxidant. Suitable such pigments, ultraviolet stabilizer, and antioxidants are well known and commonly used in connection with pigments for ionomers and need not be further described in connection with the present invention.

DETAILED DESCRIPTION OF THE INVENTION

The invention may be more fully understood by reference to the following detailed description.

A master batch of ethylene-propylene rubber blended with ionomer is prepared using standard mixing practices. Also, a master batch of ionomer with carbon black or a pigment with an ultraviolet stabilizer is prepared using standard mixing practices. The resulting master batches are then blended or alloyed according to standard mixing procedures, with or without additional amounts of the rubber or ionomer, or both, and thereafter pelleted or cubed. The pellets are then placed in an extruder with crosshead die where they are extruded onto a metal surface which has been detergent-cleaned, rinsed with pure or de-ionized water, dried and heated, with no release agent present on the surface of the metal. Ordinarily no further treatment of the metal surface is needed to obtain the desired degree of adhesion. With the metal and the blend at compatible temperatures, preferably at temperatures ranging from about 400° to 430° F., there is thus obtained excellent adhesion to the metal and a product of low surface gloss and good weatherability. Any suitable extruder can be utilized for this purpose. Similarly, low-gloss extrusions can be produced without the metal support or metal incorporation therein. Also, the blends can be used in such fabricating procedures as blow-film, injection molding, and other standard plastic manufacturing procedures.

PREPARATION 1

A master batch of EPDM (hard Mooney ML 60) 60 parts, with ionomer high acid content zinc polymer, 40 parts, was prepared by admixture in and through a Banbury TM -extruder compounding line or other extruder compounding line according to standard mixing practices used in the industry to enhance dispersion of the elastomer.

PREPARATION 2

Using the procedure as described in Preparation 1, a master batch was prepared by replacing the EPDM there employed by EPDM (soft Mooney 60 ML) and by changing the ratio to 75 parts of EPDM to 25 parts of ionomer.

The "EPDM" used in the above-described preparations is a product marketed by E. I. DuPont de Nemours & Company, Incorporated, as Nordel TM 1500. Various batches of this material vary between about 55 and 65 Mooney ML and that designated as "hard" is in the upper portion of this range, whereas that designated as "soft" is in the lower portion of the range. It is generally considered that the Mooney readings can vary plus or minus 5, without significance other than slight variations in the physical properties. These EPDMs are ethylene-propylene rubbers which are modified by a minor amount, up to about 5 percent, of 1,4-hexadiene monomer, have a high viscosity and a high green strength, and are either crystalline or semi-crystalline.

PREPARATION 3

A master batch of ionomer (high acid content zinc polymer), 80 parts, and carbon black (preferably Vulcan ® 9-a19 millimicron particle size material which ensures optimum ultraviolet stability), 20 parts, was prepared by intimate admixture in and through a Banbury TM -extruder compounding line or other compounding extruder production line according to standard mixing practices used in the industry.

The ionomer of this preparation is one marketed by E. I. DuPont de Nemours & Company, Incorporated, as Surlyn ® M1705. This product is a clear, tough material having good metal adhesiveness. The precise composition has not been revealed by the manufacturer, but it undoubtedly is an ethylene-methacrylic acid ionomer which has been at least partially neutralized by zinc ions and which has an acid content around 10 or 11 percent. It has similar properties to the copolymer designated C in Table II of U.S. Pat. No. 4,010,222, which can be used in place of the M1705, if desired.

PREPARATION 4

Using the procedure as described in Preparation 2, a master batch was prepared by replacing the EPDM there employed by EPDM (Mooney 25 ML), a product obtained from E. I. DuPont de Nemours & Company, Incorporated, as Nordel TM 2722. It also has a high green strength and is semi-crystalline, but has a lower viscosity.

PREPARATION 5

Using the procedure as described in Preparation 2, a master batch was prepared by replacing the EPDM there employed by EPR (Mooney 23 ML). This product was obtained as Exxon TM MD-456 and is a semi-crystalline copolymer of ethylene and propylene having a narrow molecular weight distribution and an ethylene content between 63 and 67 percent.

EXAMPLE 1

A compound, blend, or alloy was prepared according to standard mixing procedure and thereafter pelletized or cubed, using 44.66% of the product of Preparation 2, 13.5% of the product of Preparation 3, and 41.84% of the ionomer used in Preparation 3.

This material had the following properties:

| PROPERTY | TEST METHOD | VALUE |
| --- | --- | --- |
| Izod Impact, Notched, ft lbs/in @ R.T. | ASTM D 256 | 3.6 No Break |
| Izod Impact, Unnotched, ft lbs @ R.T. | ASTM D 256 | 6.6 No Break |
| Falling Weight Impact, Gardner, in/lbs | | |
| @ R.T. | — | 264 |
| @ −30° C. | — | 320+ |
| Tensile Strength, psi | ASTM D 638 | 1529 |
| Elongation, % | ASTM D 638 | 56% |
| Specific Gravity | ASTM D 792 | .924 |
| Hardness, | | |
| Rockwell R | ASTM D 785 | 36 |
| Shore A | ASTM D 2240 | 94 |
| Shore D | ASTM D 2240 | 35 |
| Stiffness in Flexure, psi | ASTM D 747 | 9000 |
| Flexural Modulus, psi | ASTM D 790 | 9930 |

EXAMPLE 2

A stainless steel formed strip having inturned edges was cleaned in a non-foaming detergent aqueous solution, rinsed with pure or de-ionized water, dried, heated to 400° to 430° F., and passed into the crosshead die of a Nelmor TM extruder. Concomitantly therewith, the polymer blend of Example 1 at a temperature of 400° to 430° F. was extruded into the crosshead die and onto the heated stainless steel strip passing therethrough at a rate to provide a coating 0.016 inch thick. The crosshead die was shaped to apply the polymer blend to the outer surface of the stainless steel strip, including the inturned edges, but not on the inner surface thereof. The resulting strip laminate had good adhesion and excellent water-test values as determined by standard automotive test procedures.

EXAMPLE 3

Example 2 was repeated using a stainless steel formed strip having a channel in the outer surface thereof in which the crosshead die was configured to deliver the polymer blend into said channel.

In place of the blend of Example 1, there can be substituted in Examples 2 and 3 the blends of the following examples to produce strip laminates having comparable performance characteristics.

EXAMPLE 4

Using the same procedure as described in Example 1, with 28.16% of the ionomer used in preparation 3, 13.5% of the product of Preparation 3, and 58.34% of the product of Preparation 1, a further modified ionomer blend was prepared.

EXAMPLE 5

Another compound, blend, or alloy was prepared by admixture in and through a Banbury TM -extruder consisting of 51.5% of the ionomer used in Preparation 1, 13.5% of the product of Preparation 3, and 35% of the EPDM used in Preparation 1. In place of the Banbury TM -extruding method, any continuous mixer extruder can be used.

EXAMPLE 6

A further compound, blend, or alloy was prepared by the same procedure as described in Example 5 and consisted of 62.3% of the ionomer of preparation 3, 35% of the EPDM, and 2.7% carbon black.

EXAMPLE 7

The procedure of Example 4 was repeated, replacing Preparation 1 by Preparation 4.

EXAMPLE 8

The procedure of Example 4 was repeated, substituting Preparation 1 by Preparation 5.

EXAMPLE 9

Example 6 was repeated by substituting Surlyn ® M 1705 by Surlyn ® M1652, which is not as clear as Surlyn ® M1705, but entirely suitable for use with carbon black.

EXAMPLE 10

Example 6 was repeated, using 20% EPDM, 2.7% carbon black, and 77.3% of the ionomer.

EXAMPLE 11

Example 6 was repeated, using 60% EPDM, 2.7% carbon black, and 27.3% of the ionomer.

EXAMPLE 12

A further compound, blend, or alloy was prepared by the same procedure as described in Example 5 and consisted of 62.3% of the ionomer of preparation 3, 35% of of the EPDM, and 1.4% titanium dioxide plus 0.5% of the UV Quencher, Tinuvin ®, 770; 0.7% of the UV Screener, Cyasorb ® 531, and 0.1% of the antioxidant, Irganox ® 1010.

The Tinuvin ® 770 is covered by U.S. Pat. No. 3,640,928; Cyasorb ® 531 is 2-hydroxy-4-n-octoxybenzophenone; and Irganox ® 1010 is an antioxidant containing four sterically-hindered phenolic hydroxyl groups and is covered by U.S. Pat. Nos. 3,285,855 and 3,644,482.

EXAMPLE 13

Example 12 was duplicated, substituting the Cyasorb ® 531 by 0.3% Tinuvin ® 328 and changing the amount of Tinuvin® 770 to 0.3% and the amount of titanium dioxide to 2.0%

Tinuvin® 328 is N-(2-hydroxy-3,5-di-neopentyl)-phenylbenzotriazole and is covered by U.S. Pat. No. 3,004,896.

Any of the pigments commonly used in ionomer compounding can be substituted for the titanium dioxide, or a part thereof, for example, red iron oxide, cadmium yellow, phthalocyan blue, etc. Similarly, other UV stabilizers compatible with the ionomer can be substituted for those given in Examples 12 and 13. Also, other compatible antioxidants can be substituted for the Irganox® 1010.

It is to be understood that the invention is not to be limited to the exact details of construction, operation, or exact materials or embodiments shown and described, as obvious modifications and equivalents will be apparent to one skilled in the art, and the invention is therefore to be limited only by the full scope of the appended claims.

I claim:

1. A metal trim having a tough, non-glossy adherent coating comprised of a modified ionomer blend of (1) about 20 to 60 percent of an ethylene-propylene rubber, in which ethylene is the predominant component, (2) about 40 to 80 percent of a copolymer containing ethylene units and carboxylic acid containing units, said copolymer containing between about 25 and 98.5 percent ethylene units and between about 1.5 and 30 percent carboxylic acid containing units, and said carboxylic acid units being from 10 to 100 percent neutralized with metallic ions, and (3) an effective amount up to about 10 percent of an ultraviolet stabilizing coloring material selected from the group consisting of
   (1) carbon black, and
   (2) a pigment plus an ultraviolet stabilizer, with or without an antioxidant, said coating and said trim having substantial area of flat surface-to-surface contact and said coating being adhered thereto by the inherent adhesive character of said blend.

2. A metal trim of claim 1, in which the trim is formed as a flat strip with inturned edges and in which said coating covers the flat surface of said trim including said inturned edges.

3. A metal trim of claim 2, in which the trim is formed with a flat-bottomed channel and the coating is applied to fill said channel only.

4. A metal trim with a tough, non-glossy adherent coating thereon of claim 1, formed by flowing a melt of said blend onto a cleaned and heated surface of the trim.

5. A metal trim of claim 1, in which said coloring material is carbon black.

6. A metal trim of claim 5, in which the amount of carbon black is about 2.5–5%.

7. A metal trim of claim 1, in which said coloring material is pigment plus an ultraviolet stabilizer.

8. A metal trim of claim 7, in which the blend further comprises an effective amount of antioxidant.

9. A modified ionomer blend of claim 7, in which the amount of pigment plus stabilizer is about 1.5 to 3%.

10. A modified ionomer blend of claim 9, in which the blend further comprises an effective amount, up to about 0.3%, of antioxidant.

* * * * *

UNITED STATES PATENT AND TRADEMARK OFFICE
CERTIFICATE OF CORRECTION

PATENT NO. : 4,371,583

DATED : February 1, 1983

INVENTOR(S) : Wayne F. Nelson

It is certified that error appears in the above-identified patent and that said Letters Patent is hereby corrected as shown below:

Col 5, line 25  "Surlyns#" - should read "Surlyns®",

Col 10, line 27:  "modified ionomer blend" - should read "metal trim" -

Col 10, line 29:  "modified ionomer blend" - should read "metal trim" -

Signed and Sealed this

Fifth Day of April 1983

[SEAL]

Attest:

GERALD J. MOSSINGHOFF

*Attesting Officer*  *Commissioner of Patents and Trademarks*